United States Patent
Sachidanandam et al.

(10) Patent No.: US 10,824,517 B2
(45) Date of Patent: Nov. 3, 2020

(54) BACKUP AND RECOVERY OF CONFIGURATION FILES IN MANAGEMENT DEVICE

(71) Applicant: American Megatrends International, LLC, Norcross, GA (US)

(72) Inventors: Pavithra Sachidanandam, Duluth, GA (US); Satheesh Thomas, Dunwoody, GA (US); Rajeswari Ravichandran, Duluth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 127 days.

(21) Appl. No.: 15/589,081

(22) Filed: May 8, 2017

(65) Prior Publication Data
US 2018/0322020 A1 Nov. 8, 2018

(51) Int. Cl.
*G06F 11/14* (2006.01)

(52) U.S. Cl.
CPC ...... *G06F 11/1469* (2013.01); *G06F 11/1417* (2013.01); *G06F 11/1448* (2013.01)

(58) Field of Classification Search
CPC .................................................... G06F 11/14
USPC ......................................................... 714/19
See application file for complete search history.

(56) References Cited

U.S. PATENT DOCUMENTS

| | | | | |
|---|---|---|---|---|
| 5,579,522 A * | 11/1996 | Christeson | ................ | G06F 8/65 713/2 |
| 7,322,010 B1 * | 1/2008 | Mikula | ............... | G06F 11/1469 715/734 |
| 8,886,995 B1 * | 11/2014 | Pallapothu | .......... | G06F 11/1471 714/15 |
| 2004/0210504 A1 * | 10/2004 | Rutman | ................ | G06Q 40/04 705/37 |
| 2005/0010835 A1 * | 1/2005 | Childs | ................ | G06F 11/1456 714/6.12 |
| 2005/0038986 A1 * | 2/2005 | Agan | ..................... | G06F 9/4411 713/2 |
| 2007/0174704 A1 * | 7/2007 | Shih | ..................... | G06F 11/3664 714/36 |
| 2007/0291727 A1 * | 12/2007 | Hellum | ................... | H04L 43/50 370/345 |
| 2008/0184078 A1 * | 7/2008 | Herriott | .................. | H04L 29/06 714/48 |
| 2008/0201617 A1 * | 8/2008 | Ohara | ................. | G06F 3/04847 714/57 |
| 2011/0016361 A1 * | 1/2011 | Bass | .................... | G06F 11/1433 714/48 |

(Continued)

Primary Examiner — Kamini B Patel
(74) Attorney, Agent, or Firm — Locke Lord LLP; Tim Tingkang Xia, Esq.

(57) ABSTRACT

Aspects of the disclosure relate to systems and methods of backup and recovery of configuration files in a management device. A management device includes a processor and a non-volatile memory storing a configuration file and computer executable code. The computer executable code, when executed at the processor, is configured to: perform backup of the configuration file to generate at least one backup configuration file. The at least one backup configuration file is a verified backup or an unverified backup. The verified backup is generated in response to a successful booting and a user instruction, and the unverified backup is generated by the management device automatically.

15 Claims, 4 Drawing Sheets

(56) References Cited

U.S. PATENT DOCUMENTS

| | | | | |
|---|---|---|---|---|
| 2011/0138220 A1* | 6/2011 | Gough | ................ | G06F 11/1004 714/5.1 |
| 2014/0310564 A1* | 10/2014 | Mallige | ............... | G06F 11/0781 714/47.1 |
| 2016/0283219 A1* | 9/2016 | Banford | .................. | G06F 8/658 |

* cited by examiner

BACKUP AND RECOVERY OF CONFIGURATION FILES IN MANAGEMENT DEVICE

FIELD

The present disclosure relates generally to management controller technology, and more particularly to systems and methods for backup and recovery of configuration files of the firmware of a management controller.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Configuration files (CONF) stored in a read-write (RW) area of any firmware is critical for proper functioning of the firmware services. Considering the criticality of the CONF, it has to be backed up efficiently. Some firmware doesn't take backup at all while some take backup of configuration files to backup area (BCONF) whenever there is modification of any files in CONF.

If there is a corruption in the files system, the CONF is reconstructed with the files from the BCONF. If there is a corruption in file, it is not handled because the BCONF is also a copy of the CONF and has the same file corruption. A corrupted configuration file may lead to failure to start of the relevant applications and services. In such cases, the firmware cannot be recovered even with the reboot. Since the services are not started, the commands cannot be issued to reset the configuration.

Therefore, an unaddressed need exists in the art to address the aforementioned deficiencies and inadequacies.

SUMMARY

Certain aspects of the present disclosure relate to a system, which includes a management device. The management device includes a processor and a non-volatile memory storing computer executable code. The computer executable code, when executed at the processor, is configured to: perform backup of the configuration file to generate at least one backup configuration file, wherein the at least one backup configuration file is a verified backup or an unverified backup, the verified backup is generated in response to a successful booting and a user instruction, and the unverified backup is generated by the management device automatically.

In certain embodiments, the unverified backup is obtained automatically at a predetermined time interval.

In certain embodiments, the computer executable code, when executed at the processor, is further configured to: recover the configuration file using the at least one backup configuration file based on backup time.

In certain embodiments, the computer executable code, when executed at the processor, is further configured to: when recovery from the at least one backup configuration file fails, recover the configuration file using a default configuration file.

In certain embodiments, the step of recovering the configuration file is performed when the management device is set to a recovery mode.

In certain embodiments, the management device is set to the recovery mode using a jumper connection with general purpose input/output pins (GPIOs).

In certain embodiments, the system further includes a light-emitting diode (LED) light configured to indicate status of the recovery mode.

In certain embodiments, the system further includes a remote storage device connected to the management device and configured to store the at least one backup configuration file.

In certain embodiments, there is a limited number of the unverified backups and there is a limited number of the verified backups.

In certain embodiments, the management device is a baseboard management controller (BMC).

Certain aspects of the present disclosure relate to a method for backing up and recovering configuration file in a management device. In certain embodiments, the method includes: performing backup of the configuration file to generate at least one backup configuration file, wherein the at least one backup configuration file is a verified backup or an unverified backup, the verified backup is generated in response to a successful booting and a user instruction, and the unverified backup is generated by the management device automatically.

In certain embodiments, the unverified backup is obtained automatically at a predetermined time interval.

In certain embodiments, the method further includes: recovering the configuration file using the at least one backup configuration file based on backup time.

In certain embodiments, the method further includes, when recovery from the at least one backup configuration file fails: recovering the configuration file using a default configuration file.

In certain embodiments, the recovering step is performed when the management device is set to a recovery mode using a jumper connection with general purpose input/output pins (GPIOs).

In certain embodiments, the method further includes: indicating status of the recovery mode using a light-emitting diode (LED) light.

In certain embodiments, there is a limited number of the unverified backups and there is a limited number of the verified backups.

In certain embodiments, the management device is a baseboard management controller (BMC).

Certain aspects of the present disclosure relate to a non-transitory computer readable medium storing computer executable code. In certain embodiments, the computer executable code may be the firmware or modules stored in the non-volatile memory as described above. The computer executable code, when being executed, may perform one of the methods described above. In certain embodiments, the non-transitory computer readable medium may include, but not limited to, the non-volatile memory of the management device as described above, or any other storage media of the management device. These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
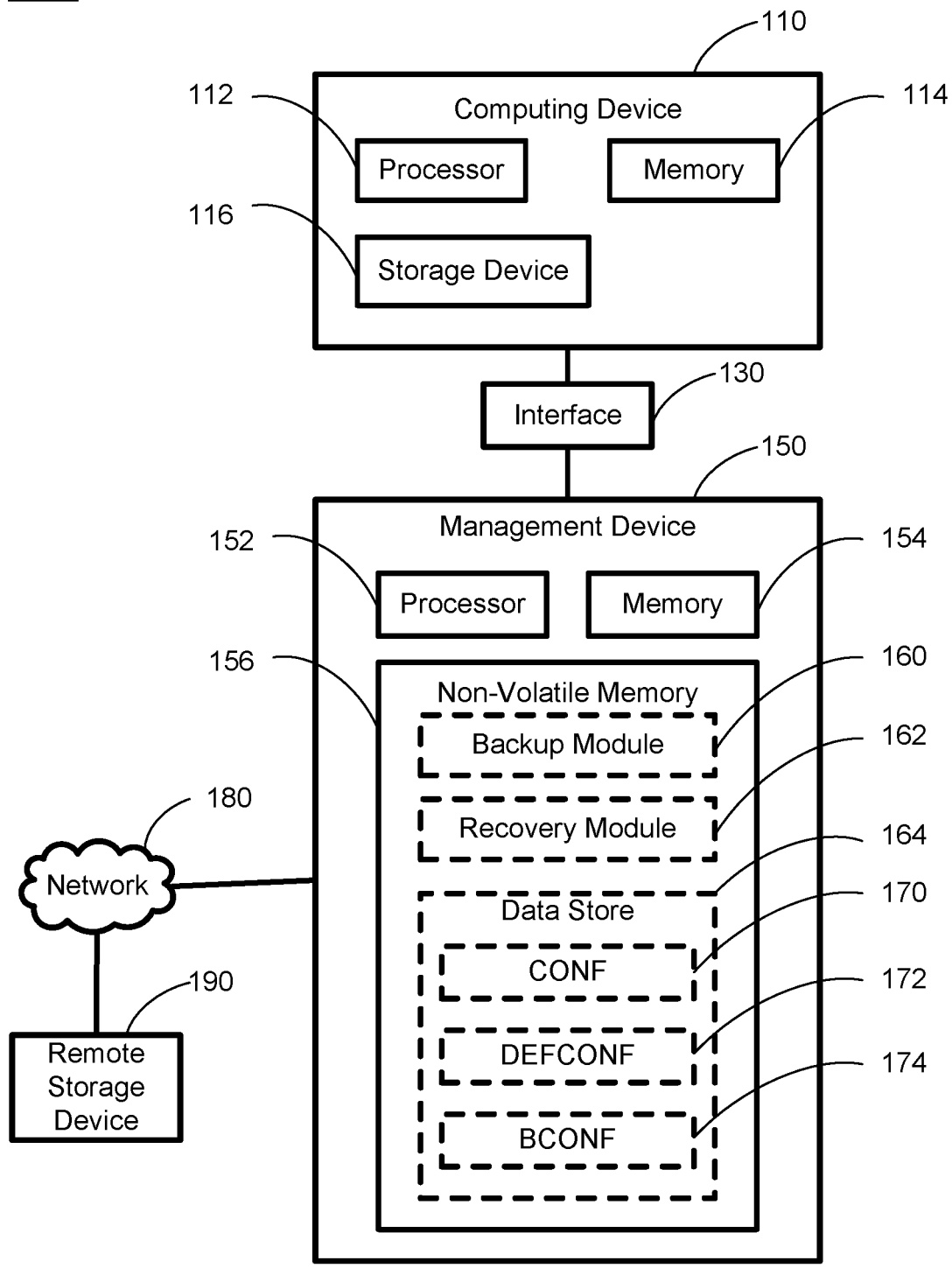
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Under certain situations, the configuration file of a firmware maybe corrupted, and the firmware is not be able to come up or provide the interface for communication. For example, if web services are not started, it is not possible to perform updates or reset the configuration. In such cases, a forced firmware update to recover the firmware is required. In certain aspects, the present invention provides a mechanism to recover any embedded firmware by restoring the configurations using a hybrid backup (automatic and maintenance mode), along with options for automatic recovery and manual recovery. In certain embodiments, the mechanism can be used for embedded Linux based firmware.

In accordance with the purposes of present disclosure, as embodied and broadly described herein, in certain aspects, the present disclosure relates to a system having a computing device and a management device in communication with the computing device. FIG. 1 schematically depicts an exemplary system according to certain embodiments of the present disclosure. As shown in FIG. 1, a system 100 includes a computing device 110, a management device 150, an interface 130 connecting the computing device 110 and the management device 150, and optionally a remote storage device 190 and a network 180 connecting the management device 150 and the storage device 190.

The computing device 110 may function as a server or a host computer of the management device 150. In certain embodiments, the computing device 110 may be a general purpose computer, a specialized computer, or a headless computer. In certain embodiments, as shown in FIG. 1, the computing device 110 may include, without being limited to, a processor 112, a memory 114, a storage device 116, and other required memory and I/O modules (not shown). Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor 112 and the memory 114 may be components embedded on the baseboard, or may be connected to the baseboard through at least one interface. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements.

The processor 112 may be a central processing unit (CPU) which is configured to control operation of the computing device 110. The processor 112 can execute an operating system (OS) or other applications of the computing device 110. In some embodiments, the computing device 100 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

The management device 150 is a microcontroller used to monitor the operation of the computing device 110. In certain embodiments, the management device 150 may be a component on the baseboard of the computing device 110. In certain embodiments, the management device 150 is a separated component from the computing device 110, and the interface 130 may be present between the computing device 110 and the management device 150. In certain embodiment, the interface 130 may be a system interface, a universal serial bus (USB) interface or a network, or any other types of interfaces to communicatively connect the management device 150 to the computing device 110.

In certain embodiments, the management device 150 may be connected to more than one computing device, and among these computing devices, only the computing device 110 functions as the host computer of the management device 150.

In certain embodiments, the management device 150 may be implemented by a system on chip (SoC), such as a BMC or a service processor (SP), or by other management controllers. The BMC refers to a specialized microcontroller that manages the interface between system management software and platform hardware. Different types of sensors can be built into the computing device 110, and the BMC reads these sensors to obtain parameters such as temperature, cooling fan speeds, power status, OS status, etc. The BMC monitors the sensors and can send alerts to a system administrator via a network if any of the parameters do not stay within preset limits, indicating a potential failure of the computing device 110. The administrator can also remotely communicate with the BMC to take some corrective action such as resetting or power cycling the system to get a hung OS running again.

In certain embodiments, the management device 150 may include necessary hardware and software components to perform certain predetermined tasks. For example, as shown in FIG. 1, the management device 150 includes a processor 152, a memory 154, and a non-volatile memory 156. In certain embodiments, the processor 152, the memory 154, and the non-volatile memory 156 may be similar to the processor 112, the memory 114, and the storage device 116 of the computing device 110. Further, the management device 150 may include other hardware components and software components (not shown) to perform its corresponding tasks. Examples of these hardware and software components may include, but not limited to, other required memory, interfaces, buses, I/O modules and peripheral devices.

The processor 152 is configured to control operation of the management device 150. In certain embodiments, the processor 152 may be a central processing unit (CPU). The processor 152 can execute any computer executable code or instructions, such as the backup module 160, the recovery module 162, and the data store 164 of the management device 150 or other applications and instructions of the management device 150. In certain embodiments, the management device 150 may run on more than one processor, such as two processors, four processors, eight processors, or any suitable number of processors.

The memory 154 can be a volatile memory, such as the random-access memory (RAM), for storing the data and information during the operation of the management device 150. In certain embodiments, the memory 154 may be a volatile memory array.

The non-volatile memory 156 is a data storage media for storing the applications of the management device 150. Examples of the non-volatile memory 156 may include flash memory, memory cards, USB drives, hard drives, floppy disks, optical drives, or any other types of non-volatile data storage devices. In certain embodiments, the management device 150 may have multiple non-volatile memories 156, which may be identical storage devices or different types of storage devices, and the applications may be stored in one or more of the non-volatile memories 156 of the management device 150.

Figure 2:
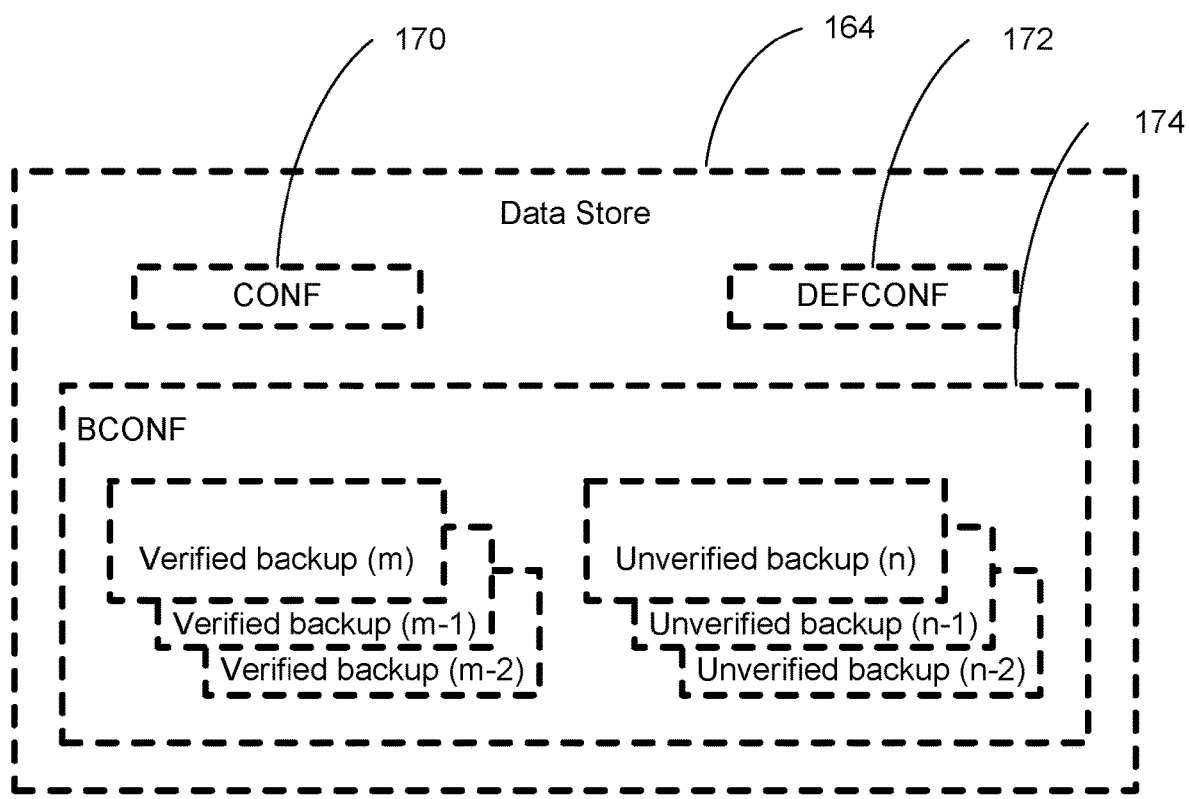
FIG. 2 schematically depicts an exemplary data store according to certain embodiments of the present disclosure.

As shown in FIG. 1, the non-volatile memory 156 of the management device 150 stores a backup module 160, a recovery module 162, and a data store 164. The data store 164 can be used to store configuration files (CONF) 170, default configuration files (DEFCONF) 172, and backup configuration files (BCONF) 174. As shown in FIG. 2, the backup configuration files 174 include verified backups and unverified backups. Each verified backup is generated in response to a successful booting and a user instruction, and each unverified backup is generated by the management device 150 automatically. In certain embodiments, the non-volatile memory 156 may include other applications or modules necessary for the operation of the management device 150. It should be noted that all of the modules are each implemented by computer executable codes or instructions, which collectively forms a software image or namely a firmware. In certain embodiments, each of the modules may further include sub-modules. Alternatively, some of the modules may be combined as one stack.

In certain embodiments, the backup module 160, when executed by the processor 152 at the memory 154, is configured to perform backup of the current configuration files (CONF) 170 of the management device 150 so as to generate one copy of backup configuration files (BCONF) 174, or namely a backup. In certain embodiments, the configuration files are backed up periodically, and when and how to back up may be based on the build time or runtime configuration. The backup in the form of tar is stored in the backup area BCONF 174. In certain embodiments, the backup module 160, when executed, is configured to perform automatic back up or maintenance mode back up to obtain the backup configuration files (BCONF) 174 of the configuration files 170.

In certain embodiments, when the backup module 160 is configured to perform automatic backup, the copies of the backup is taken automatically based on the configured parameters that control the frequency of the backup process. The backup will be stored as unverified backup. There is an upper limit on the number of unverified backups that can be stored in the system, such as "n" where "n" is a positive integer. Once the limit "n" is reached, and a new unverified backup is generated, the oldest of the unverified backup will be deleted.

In certain embodiments, when the backup module 160 is configured to perform maintenance mode backup, the backup module 160 provides a command to enter into "Maintenance Mode." In certain embodiments, the backup module 160 may provide a user interface (UI) for inputting the command. When the administrator issues this command, firmware reboots and backup of the configuration files is taken after successful boot. This backup is stored as a verified backup. There is an upper limit on the number of verified backups that can be stored in the system, such as "m" where "m" is a positive integer. The integer m may be the same or different from the integer n. Once the limit "m" is reached, and a new verified backup is generated, the oldest of the verified backup will be deleted.

In certain embodiments, the backups may be stored in the storage device 116 or the remote storage device 190 instead of the data store 164.

In certain embodiments, the recovery module 162, when executed by the processor 152 at the memory 154, is configured to perform recovery of the configuration files (CONF) 170 of the management device 150 from the backup configuration files (BCONF) 174. In many cases, the firmware can detect the need for recovery and it can automatically recover the configuration files (CONF) 170. In other cases, the firmware may not be able to detect a problem, and thus a manual recovery is needed. The recovery module 162 then performs the recovery in response to an instruction from a user or an administrator. The instruction may be configured by using a jumper with general purpose input/output (GPIO) pins.

In certain embodiments, when the recovery module 162 is configured to perform automatic recovery of the configuration files (CONF recovery), the recovery process first finds out if the reason for current boot is a specific failure of specific services (for example, web services) in the previous boot. This is to determine if CONF recovery is needed. Then the recovery process can either use verified or unverified backups for initial recovery. In certain embodiments, the unverified backups have the latest configuration before the failure happened, while the verified backups guarantee proper booting. The preference can be selected via project (PRJ) configuration. The recovery module 162 may be configured to choose one copy of the backup based on the backup time, where the latest backup configuration files are used first. If the latest backup configuration files fail, then the second latest backup configuration files are used, and so on. Thus, the backup may be performed using either the unverified backups or verified backups, as long as the used backup copy has a newer backup time. In certain embodiments, the recovery module 162 may be configured to use the latest verified backup without trying the unverified backups.

Whenever the configuration files (CONF) are updated with any backup from the BCONF, boot process continues to check if the specific service is booted properly. Otherwise, the next latest backup is used to update the configuration files (CONF). The same will be done for all the backups. If the firmware doesn't recover with multiple backups taken, the recovery process may restore the configuration files (CONF) with default configuration files (DEFCONF) 172 to enable proper startup of the management device 150.

In certain embodiments, the number of times recovery will be attempted to ensure proper service (for example the web services) start is based on the number of backups taken. In other embodiments, after a predetermined number of attempts, the firmware may try a verified backup instead of attempting the next backup file just based on the backup time. In further embodiments, after a predetermined number of attempts, the firmware may use the default configuration file instead of trying out each of the backups.

In certain embodiments, the recovery module 162 is further configured to perform manual configuration file (CONF) recovery process when firmware service is not available to external clients, but firmware has not detected the need for recovery. For example, web service may be running, but the external interface doesn't work and there is no way to communicate with firmware. In certain embodiments of the manual configuration file (CONF) recovery, firmware doesn't start recovery unless the jumper position is changed to recovery mode. This means user has to explicitly change the jumper position from "Operational Mode" to "Recovery Mode." After the jumper is set to recovery mode, firmware will perform forceful configuration file recovery. The recovery process may be the same for both manual and automatic recovery. In certain embodiments, an LED may glow orange when firmware enters recovery mode. Once the recovery is complete, it will glow green. At this time, the jumper position can be changed back to normal, i.e., the operational mode. In certain embodiment, the jumper position is set using general purpose input/output (GPIO) pins. For example, the jumper may connect GPIO pins 1 and 2 to indicate the operational mode, and connect GPIO pins 2 and 3 to indicate the recovery mode.

The data store 164 is a database for storing necessary data of, among other things, the backup module 160 and the recovery module 162. In certain embodiments, the data stored in the data store 164 may include, without being limited thereto, configuration files (CONF), default configuration files (DEFCONF) and backup configuration files (BCONF). As shown in FIG. 2, the backup configuration files 174 may include multiple verified backups and multiple unverified backups. In certain embodiments, some or all those data may also be stored in the storage device 116 or the remote storage device 190. In one example, the CONF 170 and the DEFCONF 172 are stored in the data store 164, while the BCONF 174 is stored in the storage device 116 or the remote storage device 190. In another example, the CONF 170 and the DEFCONF 172 and one of the verified and unverified backup BCONF 174 are stored in the data store 164, while the other one of the verified and unverified backup BCONF 174 is stored in the storage device 116 or the remote storage device 190.

Figure 3:
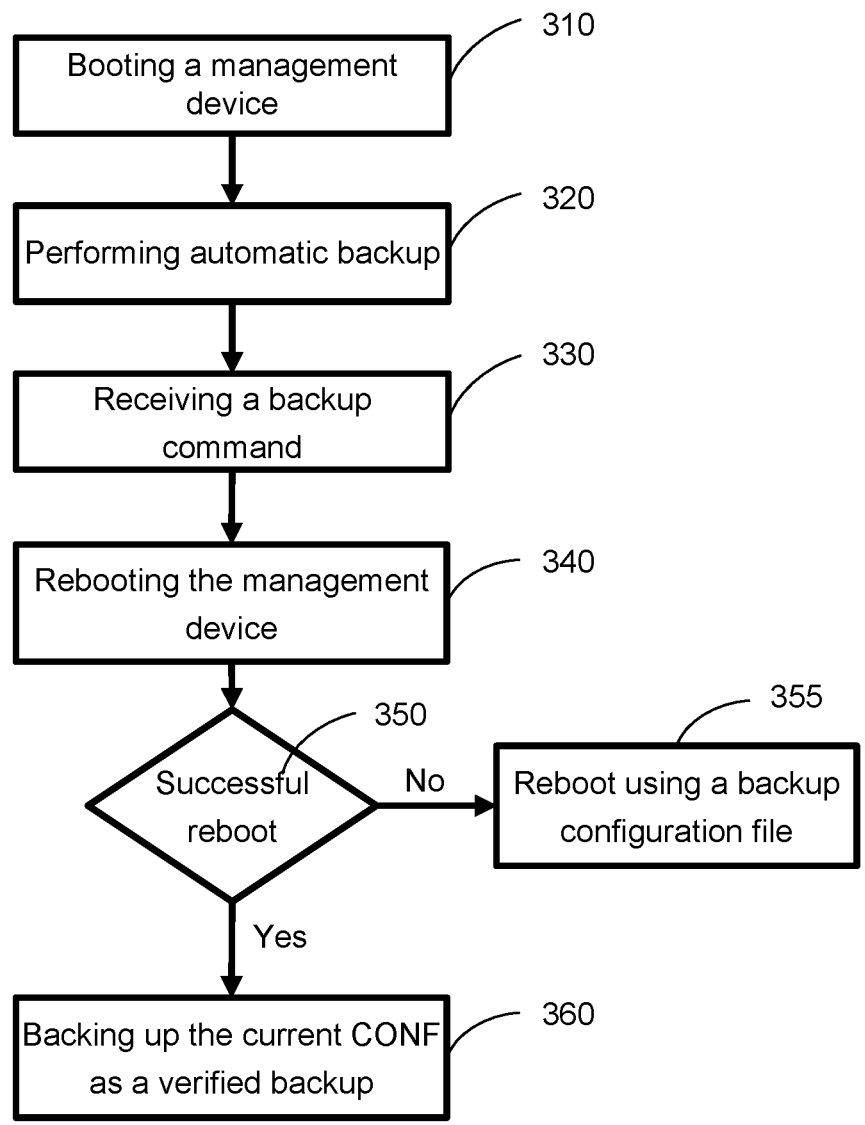
FIG. 3 depicts a process of backup of configuration files according to certain embodiments of the present disclosure.

FIG. 3 depicts a backup process for configuration files according to certain embodiments of the present disclosure. In certain embodiments, the method as shown in FIG. 3 may be implemented on a system as shown in FIG. 1. It should be particularly noted that, unless otherwise stated in the present disclosure, the steps of the process may be arranged in a different sequential order, and are thus not limited to the sequential order as shown in FIG. 3.

As shown in FIG. 3, at procedure 310, a management device 150 is powered up and booted.

At procedure 320, after the booting and during the operation of the management device 150, the management device 150 performs automatic backup of the configuration files. The automatic backup may be performed at a predetermined time interval. At the predetermined time point, the management device 150 may copy the configuration files CONF to generate a copy, which is stored in the backup area as an unverified backup. During operation, the management device 150 continues the automatic backup by storing one unverified copy at each predetermined time interval, so as to form series copies of unverified backups. In certain embodiments, the storage space for storing the unverified backups is allocated in advance, and a number of unverified backups that can be stored are predetermined. Once the data store 164 has the predetermined number of the unverified backups, and a new unverified backup is needed, the oldest one of the unverified backups is removed, so that the storage area is able to store another current copy of the configuration files.

In addition to automatic backup, the management device 150 also provides an ability of maintenance mode backup. In certain embodiments, the management device 150 achieves the maintenance mode backup by providing a backup command. Specifically, when needed, the user inputs a backup command, at process 330, the management device 150 receives the backup command, and in response to receiving the backup command, enters into "Maintenance Mode." In certain embodiments, the management device 150 may provide a user interface (UI) to the user. The UI provides options for inputting the command to activate the maintenance mode backup.

At procedure 340, the management device 150 is rebooted, and at procedure 350, it is determined if the reboot is successful.

If the reboot is successful, in other words, the current configuration files function correctly, the configuration files CONF are then copied to the data store 164. The copied BCONF has already been proved to be functioned correctly, thus is identified as a verified backup. If the reboot is not successful, the management device 150 doesn't store a copy of the configuration files.

After confirmation of the successful reboot, at procedure 360, the management device 150 saves the current CONF to the backup area as a verified backup in the BCONF area. During operation, the management device 150 may continue the manual backup once receiving the backup command from the user, and stores the current configuration files as one verified backup. Accordingly, series copies of verified backups are obtained. In certain embodiments, the storage space for storing the verified backups is allocated in advance, and a number of the verified backups are predetermined. Once the data store 164 has the predetermined number of the unverified backups, and a new verified backup is needed, the oldest one of the verified backups is removed, so that the storage area is able to store another current copy of the configuration file.

If the reboot is not successful, at procedure 355, the management device 150 may retrieve a BCONF from the list of verified backups and the unverified backups that is most recently backed up, or retrieve a newest one of the BCONF from the verified backups, so as to reboot the management device 150 correctly.

The procedures 330 to 360 form a manual backup process that is independent from the automatic backup 320, and the automatic backup and the manual backup can be performed in different sequences. In certain embodiments, the manual backup process from the procedures 330 to 360 may also be converted to an automatic process that is different from the automatic backup 320. Specifically, the new automatic backup procedures correspond to the procedures 330 to 360 may be performed soon after every successful boot of the management device 150. This new automatic procedures is different from the automatic procedure 320 in that the new automatic procedures is performed soon after a booting and a confirming that the booting of the management device 150 is successful. In certain embodiments, the successful booting may be confirmed by the user or the system itself based on certain conditions. Those conditions may include at least one of booting without error message, booting without warning message, and booting with successful managed services such as a web service.

Figure 4:
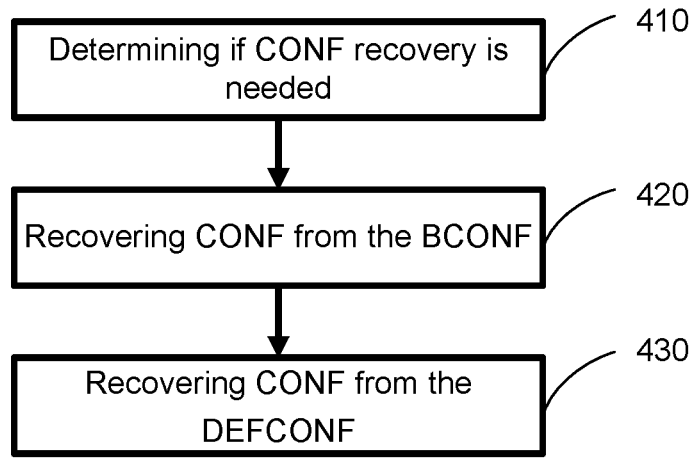
FIG. 4 depicts a process of recovery of configuration files according to certain embodiments of the present disclosure.

FIG. 4 depicts an automatic recovery process for configuration files according to certain embodiments of the present disclosure. In certain embodiments, the method as shown in FIG. 4 may be implemented on a system as shown in FIG. 1. It should be particularly noted that, unless otherwise stated in the present disclosure, the steps of the process may be arranged in a different sequential order, and are thus not limited to the sequential order as shown in FIG. 4.

At procedure 410, the recovery module 162, when executed, is configured to determine if recovery of CONF is needed. For example, if there is a specific failure of specific services in the previous boot, and a reboot is needed. When the reboot is initiated, the recovery module 162 recognizes that the current boot is performed because the previous boot has a problem, and determines that a recovery is needed. In other words, the current boot cannot use the current CONF file, but need a new configuration file. In other embodiments, if the executed recovery module 162 determines that there is no previous problem and it is not necessary to perform recovery, then the reboot may be performed as normal, and uses the current CONF during the rebooting process.

When the executed recovery module 162 determines that a recovery is needed, at procedure 420, the executed recovery module 162 recovers the configuration file from the backups, that is, copying one backup from BCONF as the CONF. In certain embodiments, the BCONF includes verified backups and unverified backups, and the latest or newest one from the verified backups and unverified backups is used in the recovery process. If the recovery fails, then the second latest or newest one form the verified backups and unverified backups is used in the recovery process. The recovery process retrieves those backups repeatedly, until a successful recovery is achieved. Once a successful recovery is achieved, a normal operation of the management device runs normally.

If all the backups have been tested or a predetermined number of backups have been tested but all have failed, then at procedure 430, the default configuration files DEFCONF is used in the recovery process and is copied as the current configuration files.

Figure 5:
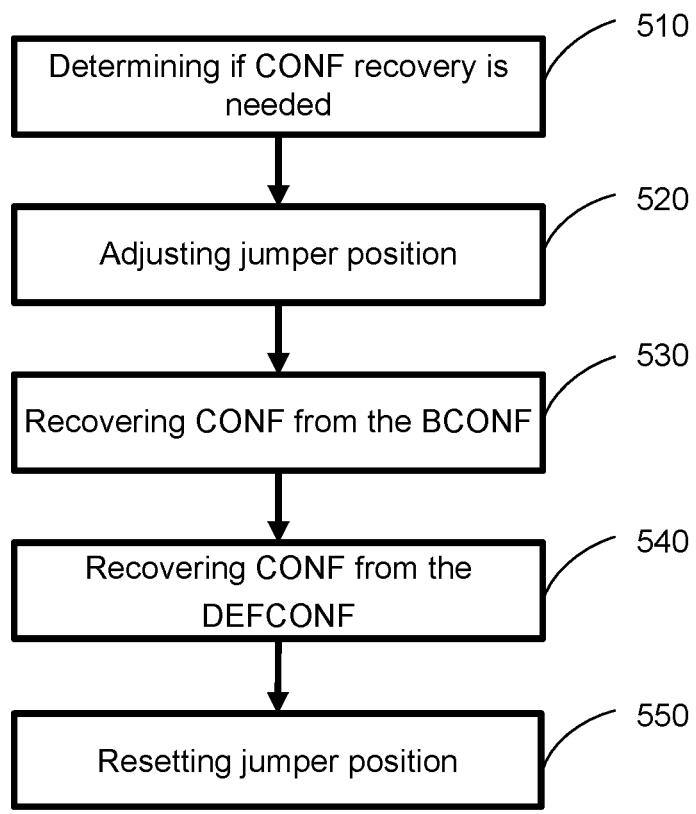
FIG. 5 depicts a process of recovery of configuration files according to certain embodiments of the present disclosure.

FIG. 5 depicts a manual recovery process for configuration files according to certain embodiments of the present disclosure. In certain embodiments, the method as shown in FIG. 5 may be implemented on a system as shown in FIG. 1. It should be particularly noted that, unless otherwise stated in the present disclosure, the steps of the process may be arranged in a different sequential order, and are thus not limited to the sequential order as shown in FIG. 5.

When firmware service is not available to external clients, but firmware has not detected the need for recovery, the user or the administrator may initiate a manual recovery process so that the management device 150 provides the firmware service correctly.

At procedure 510, the user determines if CONF recovery is needed. The determination may be, as described above, a dysfunction of a firmware service that is not detected by the executed recovery module 162.

Once it is determined by the user that a recovery is needed, at procedure 520, the user adjusting jumper position to initiate the manual recovery process. The adjusted jumper position is also known as recovery mode of the management device 150. The user may shut down the management device 150, adjust the jumper position, and then power up the management device 150.

In response to receiving the signal based on the jumper position, the management device 150 reboot under the recovery mode, and at procedure 530, the executed recovery module 162 recovers the configuration file from the backups, that is, copying one backup from BCONF as the CONF. In certain embodiments, the BCONF includes verified backups and unverified backups, and the latest or newest one from the verified backups and unverified backups is used in the recovery process. If the recovery fails, then the second latest or newest one form the verified backups and unverified backups is used in the recovery process. The recovery process retrieves those backups repeatedly, until a backup from the BCONF results in a successful recovery. Once a successful recovery is achieved, the management device 150 operates normally.

If all the backups have been tested or a predetermined number of backups have been tested but all have failed, then at procedure 540, the default configuration files DEFCONF is used in the recovery process and copied as the current configuration files.

When the recovery process is successful and the management device 150 works normally, the user can reset the jumper position back to operational mode without affecting the operation of the management device 150.

In certain embodiments, the manual CONF recovery process may also be performed automatically. For example, the management device 150 may provide a UI for entering the CONF recovery process instead of setting the jumper positions.

In another aspect, the present disclosure relates to a non-transitory computer readable medium storing computer executable code. In certain embodiments, the computer executable code may be at least a part of the backup module 160, the recovery module 162, or the data store 164 of the management device 150 as described above. The computer executable code, when being executed, may perform one of a method described above. In certain embodiments, the non-transitory computer readable medium may include, but not limited to, non-volatile memory 156 of the management device 150 as described above, or the remote storage device 190, or any other storage media of the management device 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management device, comprising a processor and a non-volatile memory storing a current copy of a configuration file, at least one backup copy of the configuration file, a default copy of the configuration file, and computer executable code, wherein the default copy of the configuration file is stored separately from the at least one backup copy of the configuration file and the current copy of the configuration file;
wherein the computer executable code, when executed at the processor, is configured to:
perform backup of the configuration file to generate the at least one backup copy of the configuration file, wherein the at least one backup copy of the configuration file is a verified backup or an unverified backup, the verified backup is generated in response to a successful booting and a user instruction, and the unverified backup is generated by the management device automatically;
recover the configuration file using the at least one backup copy of the configuration file based on backup time; and
when recovery from the at least one backup copy of the configuration file fails, recover the configuration file automatically using the default copy of the configuration file.

2. The system of claim 1, wherein the unverified backup is obtained automatically at a predetermined time interval.

3. The system of claim 1, wherein the step of recovering the configuration file is performed when the management device is set to a recovery mode.

4. The system of claim 3, wherein the management device is set to the recovery mode using a jumper connection with general purpose input/output pins (GPIOs).

5. The system of claim 4, further comprising a light-emitting diode (LED) light configured to indicate status of the recovery mode.

6. The system of claim 1, further comprising a remote storage device connected to the management device and configured to store the at least one backup copy of the configuration file.

7. The system of claim 1, wherein there is a limited number of the unverified backups and there is a limited number of the verified backups.

8. The system of claim 1, wherein the management device is a baseboard management controller (BMC).

9. A method for backing up and recovering a configuration file in a management device, comprising:
performing backup of the configuration file to generate at least one backup copy of the configuration file, wherein the at least one backup copy of the configuration file is a verified backup or an unverified backup, the verified backup is generated in response to a successful booting and a user instruction, and the unverified backup is generated by the management device automatically;
recovering the configuration file using the at least one backup copy of the configuration file based on backup time; and
when recovery from the at least one backup copy of the configuration file fails: recovering the configuration file automatically using a default copy of the configuration file, wherein the default copy of the configuration file is stored separately from the at least one backup copy of the configuration file and a current copy of the configuration file.

10. The method of claim 9, wherein the unverified backup is obtained automatically at a predetermined time interval.

11. The method of claim 9, wherein the recovering step is performed when the management device is set to a recovery mode using a jumper connection with general purpose input/output pins (GPIOs).

12. The method of claim 9, further comprising:
indicating status of the recovery mode using a light-emitting diode (LED) light.

13. The method of claim 9, wherein there is a limited number of the unverified backups and there is a limited number of the verified backups.

14. The method of claim 9, wherein the management device is a baseboard management controller (BMC).

15. A non-transitory computer readable medium storing computer executable code, wherein the computer executable code, when executed at a processor of a management device, is configured to:
perform backup of a configuration file to generate at least one backup copy of the configuration file, wherein the at least one backup copy of the configuration file is a verified backup or an unverified backup, the verified backup is generated in response to a successful booting and a user instruction, and the unverified backup is generated by the management device automatically;
recovering the configuration file using the at least one backup copy of the configuration file based on backup time; and
when recovery from the at least one backup copy of the configuration file fails: recovering the configuration file automatically using a default copy of the configuration file, wherein the default copy of the configuration file is stored separately from the at least one backup copy of the configuration file and a current copy of the configuration file.

* * * * *